No. 630,714. Patented Aug. 8, 1899.
C. W. KENNEDY.
STORAGE BATTERY.
(Application filed Apr. 13, 1898.)
(No Model.) 3 Sheets—Sheet 1.

WITNESSES
Marcus L. Byng
Arthur P. Bryant

INVENTOR
Charles W. Kennedy
by H. K. Bliss
Attorney

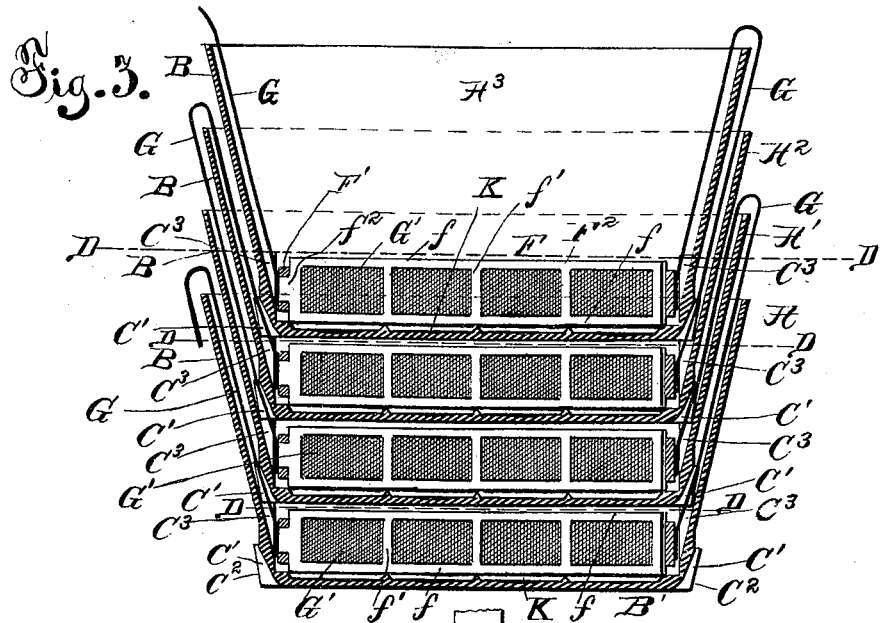
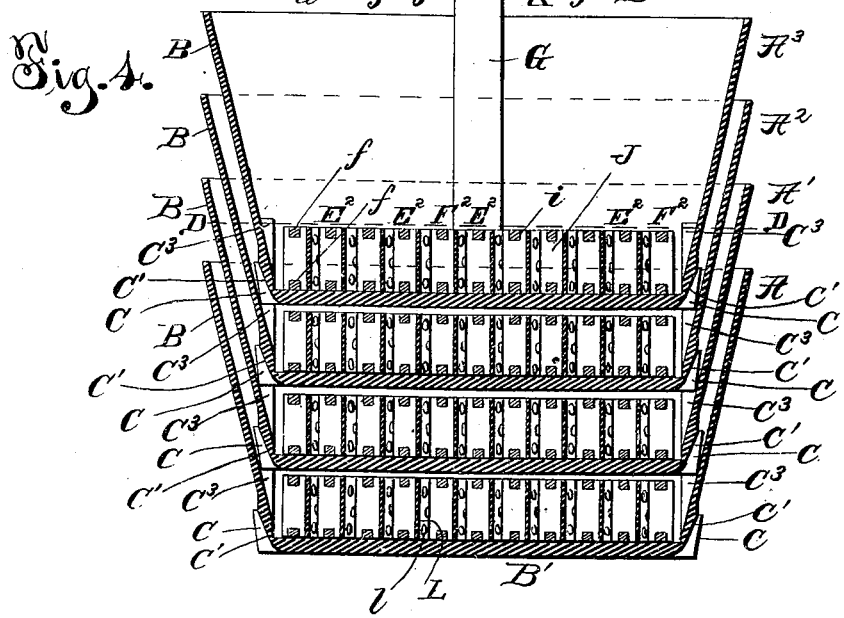

No. 630,714. Patented Aug. 8, 1899.
C. W. KENNEDY.
STORAGE BATTERY.
(Application filed Apr. 13, 1898.)
(No Model.) 3 Sheets—Sheet 3.
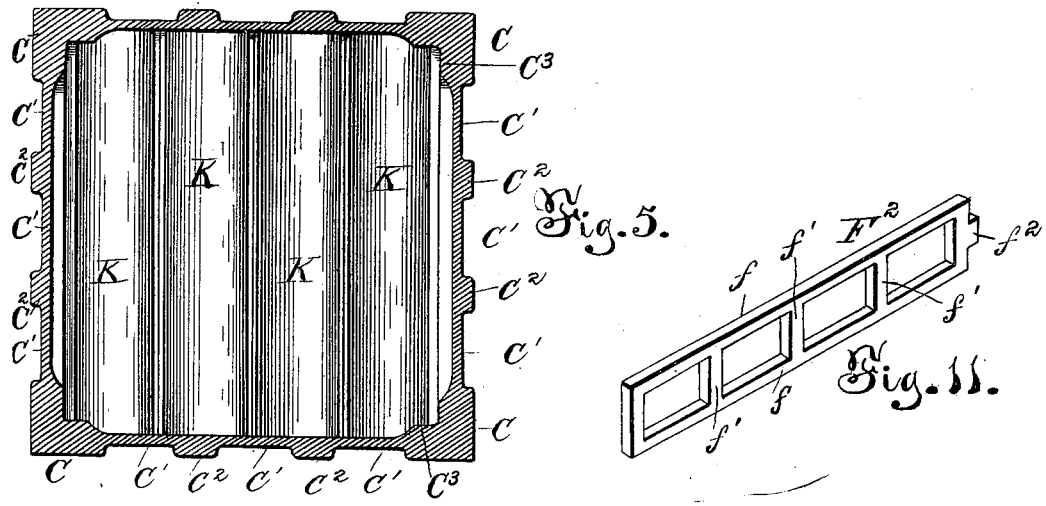
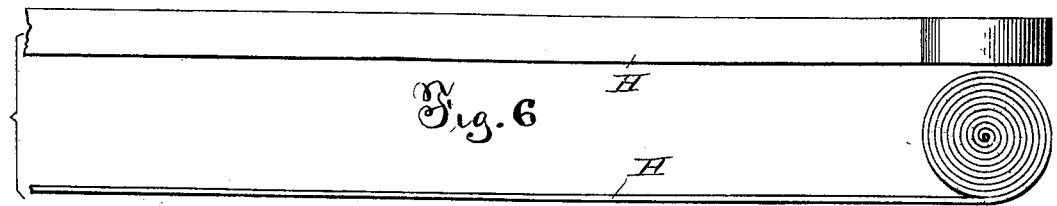
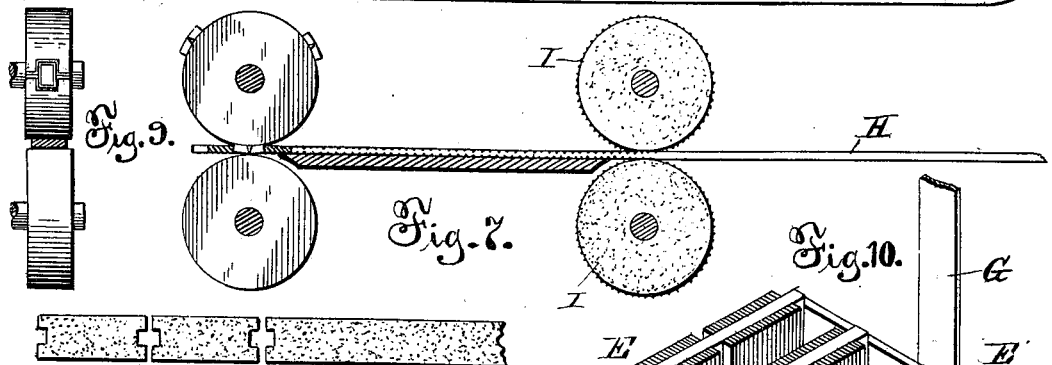
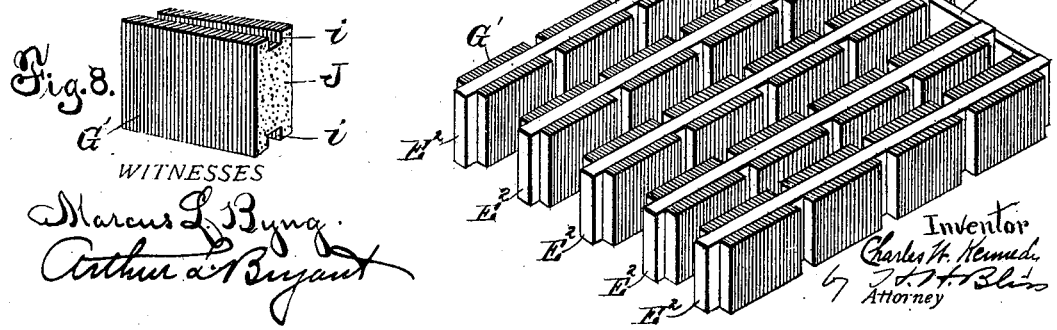
WITNESSES
Marcus L. Byng
Arthur L. Bryant
Inventor
Charles W. Kennedy
by F. H. Bliss
Attorney

UNITED STATES PATENT OFFICE.

CHARLES W. KENNEDY, OF RUTLEDGE, PENNSYLVANIA, ASSIGNOR, BY MESNE ASSIGNMENTS, TO THE ELECTRIC POWER DEVELOPMENT COMPANY.

STORAGE BATTERY.

SPECIFICATION forming part of Letters Patent No. 630,714, dated August 8, 1899.

Application filed April 13, 1898. Serial No. 677,466. (No model.)

*To all whom it may concern:*

Be it known that I, CHARLES W. KENNEDY, a citizen of the United States, residing at Rutledge, in the State of Pennsylvania, have invented certain new and useful Improvements in Storage Batteries; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1:
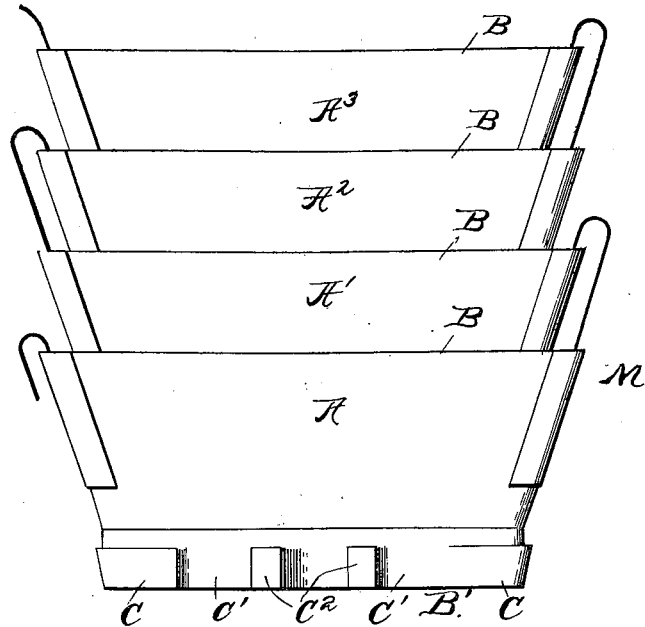
Figure 2:
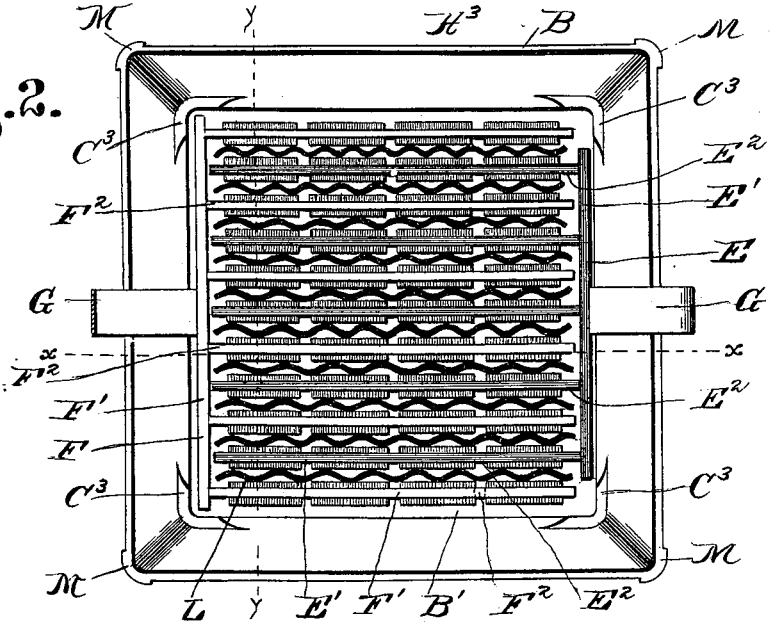

Figure 1 is a side elevation of a sufficient portion of a storage battery to illustrate the manner of embodying my invention. Fig. 2 is a top plan view. Fig. 3 is a vertical section on the line X X of Fig. 2. Fig. 4 is a vertical section on the line Y Y, Fig. 2. Fig. 5 is a horizontal section through the base portion of a cell. Figs. 6 to 9 illustrate steps in forming the active material of lead tape. Fig. 10 is a perspective of one of the electrodes. Fig. 11 is a perspective of one of the supporting bars or fingers of an electrode which carry the active material.

In the drawings, A A' A² A³ indicate a series of cells, trays, or cups constructed with my improvements. Each of these is a counterpart of the other and is formed with the upper flaring portion B and also the bottom portion B'. The upper part B is formed of thin hard rubber or suitable insulating material, and the walls thereof are flared in substantially the way shown, so as to provide for the nesting of one cell within another.

Among the objects of the invention is this, namely, to provide a series of superposed nested cells which shall be of minimum weight and maximum power, which shall have the active material all on the central vertical lines of the battery, which shall permit the bottom portion of one cell to rest directly upon the bottom portion of another, so that the upper parts of the cell can be thin and light and not be required to sustain any of the weight and be out of contact with each other to prevent possibility of short-circuiting, and which shall have horizontally-disposed electrodes with all of the parts of each in relatively low planes, so that a shallow body of electrolyte can be employed. To accomplish some of these objects, the cells are shaped in the way shown. Below the upper wider flared part B of each there is the aforesaid shallow bottom portion B', the walls of which are thicker or heavier in places, at least, than are those of the upper flared part, and the sides are vertical or approximately vertical.

The bottom portion B' of each cell has outwardly-extending projections or thickened sections, as shown at C. Preferably there is one of these at each corner and outside thereof for purposes to be described. Between these there are one or more open passage-ways at C'. A passage-way or opening can be provided extending from one of the outside corner projections to the other, or a series of such passage-ways can be provided with intervening lugs or extensions C². These are open and do not extend above the strong base part B' of each cell. Then upon the inside of the cell there are a series of inner projecting lugs or thickened parts at C³. They preferably correspond in position to the outer extensions C, though their tops are in or near the top plane of the base part B'. By examining the drawings it will be seen that when the cells are constructed with these features they can be readily superposed and nested one within the other, that at A' fitting within that of A and having its exterior lugs or thickened parts C fitting in or resting upon the interior lugs or shoulders C³ of the outer cell. Not only do these parts at the base of the cells thus provide a means for attaining a support of one of them upon another, but they also, as will be seen, are adapted to lock each against lateral displacement as to the other, and it will be further seen that all of these contact-surfaces are below the top surface of the electrolyte at D, and consequently effective provision is made for avoiding the contact of the upper part of any one of the cells with either of those adjacent.

I am aware that heretofore it has been proposed to make rubber or non-conducting cells of thick hard rubber and form flanges around the upper parts which could overlap and engage with each other by means of screwthreads or otherwise, said vertical part of each one taking the vertical thrust of gravity of the entire series of cells above it. In my construction the upper part of each cell is relieved entirely of the pressure of support and can therefore be made thin and light, only such thickness being required as will insure proper insulation and the retaining of the contents, the weight of the electrodes and the similar weight of the cells being received and carried by the thickened central or base parts B'. Not only do I thus provide cells which, considered by themselves, have features of advantage and marked superiority, but I also combine with them electrodes of novel construction and arrangement adapted to cells of this sort.

The positive and the negative electrodes are substantially similar to each other and are formed as follows: Each has a cross plate or bar and a series of finger-like bars projecting laterally therefrom. The positive electrode is indicated as a whole by E, its cross connecting-bar by E', and its lateral-extending bars or fingers by $E^2$. The negative electrode is indicated as a whole by F, its cross-bar being shown at F' and its lateral-projecting bars or fingers at $F^2$. These electrodes are arranged as couples, there being a positive and a negative in the bottom part B' of each of the trays or cells. The fingers or bars $E^2$ $F^2$ interlap or lie parallel to each other, all being horizontally disposed. Consequently they can be covered by or submerged in a shallow mass of electrolyte and yet be able to absorb and return a powerful current. When looked upon in plan view, as in Fig. 2, the fingers or bars $E^2$ of the positive electrode each lie between two of the fingers or bars $F^2$ of the negative.

The negative electrode of a cell below is connected with a positive electrode of a cell above in any suitable way. As shown, the conductor G extends upward from the positive electrode of one cell, inside thereof, over the edge, and down the outside thereof to the base of the cell below, where it is connected to the negative electrode.

It is well known that storage batteries have failed to go into extensive use for several reasons, including that of their being very heavy in proportion to the amount of power available from them. One of the matters which has necessitated this great weight has been the form of the electrode. Use is generally made of carrier or supporting plates of lead alloy, which are coated or charged with layers or pellets of some of the forms of lead. In these earlier electrodes the ratio of active surface to the weight of the total electrode is low.

I have succeeded, as above described, in producing a cell or tray which of itself is very light, and I will now call attention to the electrodes which I have devised and which are advantageously adapted for use in connection with such a cell or tray. As both electrodes are similarly constructed a description only of the one at F is required. Its fingers or bars $F^2$ are each formed as a thin elongated frame-piece—that is to say, with a top bar $f$, a bottom bar $f$, and a series of vertical cross-bars $f'$. At $f^2$ it has a lug or extension by which it can be secured to a cross-bar F'. Between the bars of this frame-piece there are apertures or large openings, as will be seen. In these openings I apply the principal part of the active material, the bodies thereof being shown at G'. These bodies or masses are built up of pieces of lead tape. The smooth lead tape H, Fig. 6, is first provided with indentations by passing it between suitably-shaped rollers, as shown at I in Fig. 7, the active faces of which rollers have suitable projections for imparting the desired shape to the lead. Ordinarily I employ rollers, to the faces of which emery, corundum, or other suitable material is applied, it being adapted to form a large number of minute but strongly-pronounced indentations which enlarge greatly the exposed and active surface of the lead. After the lead has been prepared in this way it is cut into lengths J, as shown in Fig. 8. These short sections of the tape are provided at each end with a slot or groove $i$. This can be done by the cutter which severs the sections from the tape, or a number of the sections can be secured together in a block-like mass and then the grooves can be cut by any suitable tool. After the sections J have been thus formed they are inserted into the bars or frame-pieces F'. Each is held by having its slot $i$ arranged to receive the bars $ff$. The opening in the bar F' is packed with as many of these sections as are necessary, allowance being made for expansion. It will be readily seen that there is an extensive total active surface thus exposed. Moreover, the lead sections are of such nature and so arranged that warping and buckling are prevented and expansion provided for.

To insert the slotted pieces or sections J it is only required that they should be inclined a little in order to insert them into their places, and such inclining is permitted generally from the fact that when they are being newly introduced a slight open space is left at the end of each compartment to permit of the expansion above referred to; but if it is necessary or preferred to pack them tightly those at the end of each series can have their ends bent a little, so as to permit insertion, after which said ends are bent into their straightened position. It will also be seen that the solid supporting metal—to wit, the frame-bars $ff'$—are reduced to the minimum in size and weight, in contradistinction to the support portion which carries the active material of the electrodes commonly in use.

In brief, I believe myself to have devised an electrode which is all, including the supporting part, active material with exposed surfaces, and which is therefore one of the lightest known relative to its total weight.

It is particularly adapted for use in storage batteries of the sort illustrated. The two electrodes of each couple are horizontally disposed and occupy but little room vertically, they lying between the horizontal bottom of one cell and the similar bottom of the cell below. Therefore their mass and weight are brought to the central part of the battery, and they are all in compact relation, in contradistinction from the batteries heretofore produced having flaring cup-cells, which were brought down to a narrow bottom and had the active material placed between the flaring wall of one and the flaring wall of the next. The electrolyte, as aforesaid, is shallow and thoroughly protected against spilling by the height of the thin upwardly-extending flaring portion. Each upper cell is supported vertically and braced laterally by the one below it at points below the top of the electrolyte, and thus I dispense with contacting flanges or similar parts interposed between the upper part of one cell and that of another, such as have been heretofore used in making the thicker rubber cells that have been proposed. I avoid any possibility of short-circuiting. The steps followed in forming the cell or in imparting to it its electrical qualities and in charging it may be of the well-known sort. The mechanical and electrical actions that occur will cause from time to time the depositing of undesirable materials, such as sulfate of lead, and often these accumulate to form a sediment at the bottom, where they interfere seriously with the proper action of the electrodes. To avoid such interference, I form in the bottom of the cell a series of pockets or cavities K, either by making depressions in the castings or by forming ribs extending up from the bottom wall. The electrodes E F rest upon these and any materials dropping will fall entirely below the bottom of the electrodes. It will be seen that the electrodes of each couple lie in the same horizontal planes—that is to say, that the alternating and overlapping fingers or arms are horizontally opposite to each other, being in this respect distinguishable from the batteries heretofore used or proposed, in which the electrodes were arranged vertically opposite to each other, one being secured to the under side of the bottom wall of the cell.

In the present construction I avoid entirely the trouble and expense incident to securing either of the electrodes to the under side of its tray or cell and make the whole battery vertically more compact to the extent of the vertical dimension of one of the electrodes, taken as many times as there are cells.

The alternating positive and negative fingers or arms $E^2 F^2$ are held apart and kept at a suitable distance by means of suitable spacing and bracing devices L of corrugated or sinuous strips of thin hard rubber perforated, as shown at $l$, to permit free circulation of the electrolyte and free passage of the current. They can be cheaply and easily made by bending strips of perforated sheet-rubber to give numerous braces or holders, as shown.

The upper flaring portion of the tray being of thin light rubber I combine therewith reinforcing or bracing devices in the form of angle pieces of rubber M, respectively situated at the corners of the rectangle and being welded or intimately connected to the two walls at points near the corner.

What I claim is—

1. In a storage battery, a cell formed of hard rubber or non-conducting material having the upper flaring part, and the lower approximately vertical base portion, formed with the lugs or thickened portions extending more or less outwardly, and the lugs or thickened portions extending inward, said lugs being adapted to give vertical support and lateral bracing for the bottom of said tray with relation to the one below and the one above it, substantially as set forth.

2. In a storage battery a series of superposed, nested, hard-rubber, or non-conducting cells, each having an upper flared portion and a lower substantially vertical base portion, the base portion of one cell resting upon the base portion of the one below and receiving the base portion of the one above, and having, in the interior of its base, lugs or supports to receive the vertical thrust of the one above and exterior lugs or projections with passage-ways between them for fitting laterally against the base portions of the cell below, substantially as described.

3. In a storage battery, a series of hard-rubber, or non-conducting cells, each having an upper flaring portion and a base portion adapted to fit and rest upon the base portion of a cell below and to fit and receive the base portion of the cell above, and formed with means upon its interior for laterally staying the one above it, and having upon its exterior lugs bearing against the interior of the walls of the one below with passage-ways between said lugs for the escape of gases, substantially as set forth.

4. In a storage battery, a series of two or more hard-rubber or non-conducting cells, each having upward and outward flaring walls, and a horizontal bottom, in combination with electrodes arranged in couples, the electrodes of each couple lying in the same horizontal planes, and situated between the bottom of one cell and the bottom of the cell below, substantially as set forth.

5. A storage battery having a series of superposed and nested upward and outward flaring, hard-rubber, or non-conducting cells, each cell having a horizontal bottom, in combination with electrodes arranged in couples, the electrodes of each couple lying between the bottom of one cell and the bottom of the cell below, and both resting upon the upper side of the bottom of the lower cell, substantially as set forth.

6. A storage battery having a series of superposed nested, upward and outward flaring, hard-rubber, or non-conducting cells, each cell having a horizontal bottom, in combination with a negative electrode having a series of horizontally-projecting arms and a positive electrode having a series of horizontally-projecting arms, said positive arms and negative arms being disposed in the same horizontal planes, and lying between the bottom of one cell and the bottom of the cell below, substantially as set forth.

7. In a storage battery a series of superposed nested, flaring hard-rubber, or non-conducting cells, the bottom portion of each cell fitting and bearing directly downward upon the bottom portion of the cell below, and each cell having resting upon its bottom a couple of electrodes, each electrode consisting of a series of horizontally-arranged fingers or arms, the fingers or arms of one electrode alternating with those of the other, and all lying in substantially the same horizontal planes, and between the bottom of one cell and the bottom of the cell below, substantially as set forth.

8. In a storage battery a series of superposed non-conducting cells, each fitted to and resting upon the one below in combination with a couple of electrodes each electrode having a series of horizontally-arranged arms or bars alternating with the arms or bars of the other electrodes, and secured to an end bar, all of said arms of the two electrodes lying in substantially the same horizontal planes between the bottom of one cell and the bottom of the cell below, and perforated spacing and bracing devices between each negative electrode-arm and the adjacent positive electrode-arms, substantially as set forth.

In testimony whereof I affix my signature in presence of two witnesses.

CHARLES W. KENNEDY.

Witnesses:
WM. FINDLAY BROWN,
MORRIS R. BOCKINS.